United States Patent
Wang et al.

(10) Patent No.: US 11,079,853 B2
(45) Date of Patent: Aug. 3, 2021

(54) ACTUATOR EXCITATION SIGNAL PROCESSING METHOD, DEVICE, COMPUTER EQUIPMENT AND STORAGE MEDIUM

(71) Applicant: AAC Technologies Pte. Ltd., Singapore (SG)

(72) Inventors: Xiuyue Wang, Shenzhen (CN); Zheng Xiang, Shenzhen (CN); Xuan Guo, Shenzhen (CN); Tao Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/994,686

(22) Filed: Aug. 17, 2020

(65) Prior Publication Data
US 2020/0409463 A1    Dec. 31, 2020

Related U.S. Application Data

(63) Continuation of application No. PCT/CN2019/093609, filed on Jun. 28, 2019.

(51) Int. Cl.
*G08B 6/00* (2006.01)
*G06F 3/01* (2006.01)
*G06F 30/20* (2020.01)

(52) U.S. Cl.
CPC .............. *G06F 3/016* (2013.01); *G06F 30/20* (2020.01); *G08B 6/00* (2013.01)

(58) Field of Classification Search
CPC ................................. G06F 3/016; G08B 6/00
USPC ...................... 340/407.2, 517, 521, 540, 541
See application file for complete search history.

(56) References Cited

U.S. PATENT DOCUMENTS

| | | | |
|---|---|---|---|
| 10,620,704 B2 * | 4/2020 | Rand | G06F 3/016 |
| 2018/0028910 A1 * | 2/2018 | Aoki | A63F 13/285 |

* cited by examiner

*Primary Examiner* — Tai T Nguyen
(74) *Attorney, Agent, or Firm* — W&G Law Group LLP

(57) ABSTRACT

An actuator excitation signal processing method includes the step of obtaining original excitation signal. An encrypted excitation signal was obtained by encrypting the original excitation signal. Vibration waveforms generated by the encrypted excitation signal and the original excitation signal while acting on the actuator are same. The encrypted excitation signal is used to drive the actuator to vibrate. The actuator excitation signal processing method can effectively solve the problem that the excitation signal might be stolen by encrypting the original excitation signal. In addition, an actuator signal processing device, a computer equipment and a kind of storage medium are also proposed.

7 Claims, 4 Drawing Sheets

```
                         ┌─102
┌──────────────────────────────────────────────┐
│    Obtaining an original excitation signal   │
└──────────────────────────────────────────────┘
                         │
                         ┌─104
┌──────────────────────────────────────────────┐
│  encrypting the original excitation signal   │
│  to obtain an encrypted excitation signal,   │
│  generating vibration waveforms by the       │
│  encrypted excitation signal same to the     │
│  waveforms generated by the original         │
│  excitation signal                           │
└──────────────────────────────────────────────┘
                         │
                         ┌─106
┌──────────────────────────────────────────────┐
│ driving an actuator by the encrypted         │
│ excitation signal                            │
└──────────────────────────────────────────────┘
```

ACTUATOR EXCITATION SIGNAL PROCESSING METHOD, DEVICE, COMPUTER EQUIPMENT AND STORAGE MEDIUM

FIELD OF THE PRESENT DISCLOSURE

The invention relates to the field of signal processing, in particular to an actuator excitation signal processing method, a device, a computer equipment and a storage medium.

DESCRIPTION OF RELATED ART

Tactile sense is an important way for people to perceive the world, which is different from sight and hearing. In some relatively abstract scenes without sound and picture conditions, tactile sensation can bring accurate judgment and rich information prompts to users, so it has great application value.

With the continuous rise of the mobile phone industry, game industry, VR industry and other markets in the haptic field, haptic feedback in the form of vibration is widely used in electronic consumer products. The vibration feedback of different experiences is realized by different excitation signals acting on the actuator (for example, a vibration motor) (refer to FIG. 2). Incentive signals of traditional electronic equipment can be easily collected and easily copied by competitors, resulting in frequent theft of incentive signals, which causes losses to developers of incentive signals.

SUMMARY OF THE INVENTION

One of the main objects of the invention is to provide an actuator excitation signal processing method which can effectively solve the problem that the excitation signal might be stolen by encrypting the original excitation signal.

Thus, the invention provides an actuator excitation signal processing method comprising steps of:

obtaining original excitation signal;

encrypting the original excitation signal to obtain an encrypted excitation signal;

generating vibration waveforms by the encrypted excitation signal same to the waveforms generated by the original excitation signal.

driving an actuator by the encrypted excitation signal.

Further, the step of encrypting the original excitation signal to obtain an encrypted excitation signal includes:

performing vibration simulation on the original excitation signal for obtaining a simulated vibration acceleration waveform;

equalizing the simulated vibration acceleration waveform for obtaining the encrypted excitation signal.

Further, the step of equalizing the simulated vibration acceleration waveform for obtaining the encrypted excitation signal includes:

modulating the high frequency or low frequency in the simulated vibration acceleration waveform for obtaining an encrypted excitation signal.

Further, the step of performing vibration simulation on the original excitation signal for obtaining a simulated vibration acceleration waveform includes:

obtaining a linear parameter of the actuator;

performing vibration simulation on the original excitation signal according to the linear parameter to obtain the simulated vibration acceleration waveform.

Further, the actuator is a motor; the step of obtaining the linear parameter of the actuator includes:

obtaining the linear parameters of the motor;

and the step of performing vibration simulation on the original excitation signal according to the linear parameter to obtain the simulated vibration acceleration waveform includes:

performing the vibration simulation on the original excitation signal according to the linear parameters of the motor to obtain the simulated vibration acceleration waveform.

Further, the step of encrypting the original excitation signal to obtain the encrypted excitation signal includes:

performing at least one vibration simulation model on the original excitation signal to obtain a simulated vibration acceleration waveform;

equalizing the simulated vibration acceleration waveform by at least one equalization module to obtain the encrypted excitation signal.

The invention further provides an actuator excitation signal processing device comprising:

an acquisition module for acquiring original excitation signal;

an encryption module for encrypting the original excitation signal to obtain an encrypted excitation signal; wherein vibration waveforms generated by the encrypted excitation signal and the original excitation signal which acting on the actuator respectively are the same; and a driving module for driving the actuator to generate vibration using the encrypted excitation signal.

Further, the encryption module is used for performing vibration simulation on the original excitation signal to obtain a simulated vibration acceleration waveform; equalization is performed on the simulated vibration acceleration waveform to obtain the encrypted excitation signal.

The invention further provides a computer device includes a memory and a processor, wherein the memory stores a computer program; when the computer program is executed by the processor, the processor is triggered to perform the steps as described above.

The invention further provides a computer-readable storage medium stores a computer program executed by a processor, wherein the processor performs the steps as described above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
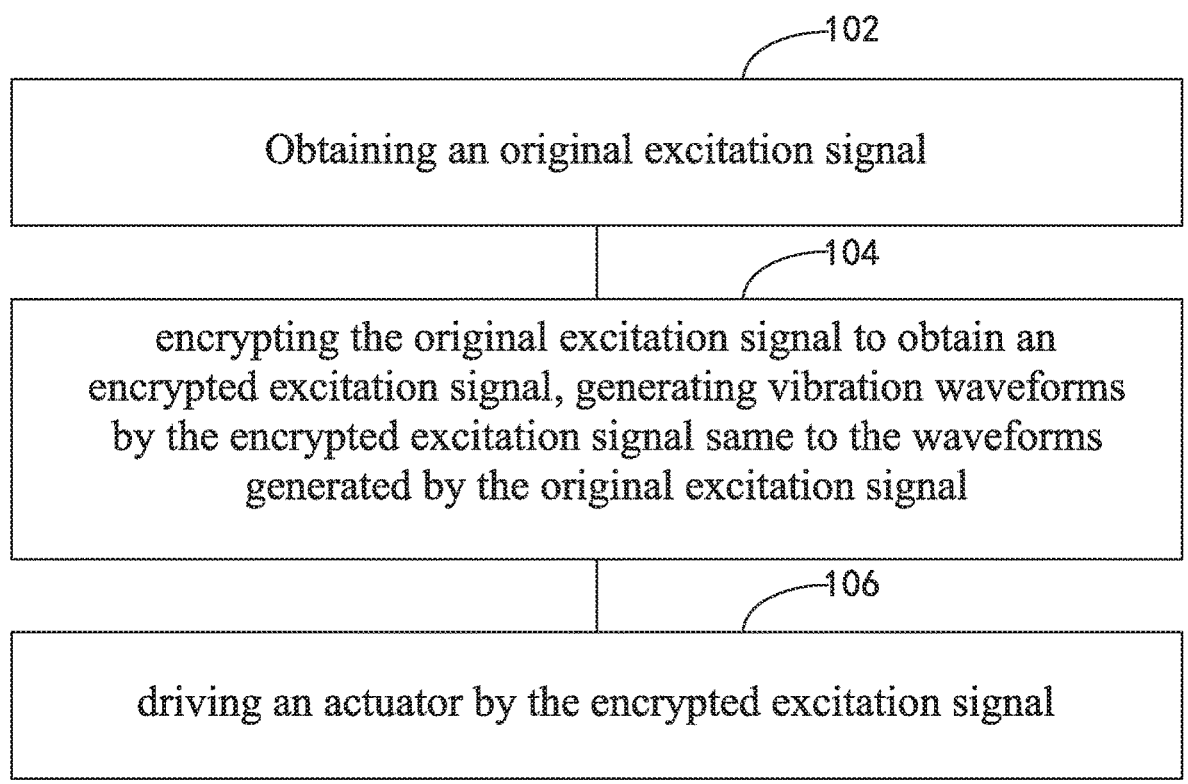
FIG. 1 is a flow chart of an actuator excitation signal processing method in an embodiment of the present invention.

As shown in FIG. 1, an actuator excitation signal processing method is proposed. The actuator excitation signal processing method can be applied to a terminal. This embodiment is exemplified by being applied to a terminal. The actuator signal processing method specifically includes the following steps:

Step 102: Obtaining the original excitation signal.

Figure 2:
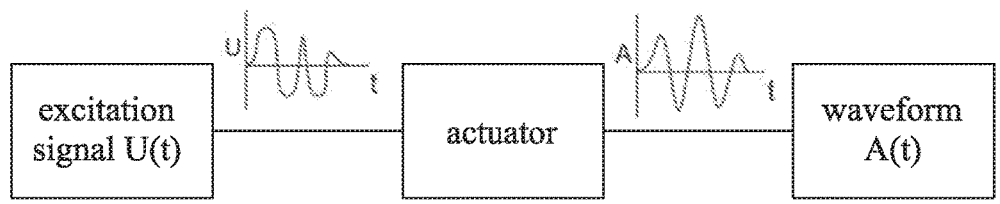
FIG. 2 is a traditional process schematic view of directly using an original excitation signal to act on an actuator.

Wherein, the excitation signal is used to drive the actuator vibration. The original excitation signal refers to the unencrypted excitation signal. The original excitation signal can generate the corresponding vibration waveform by directly acting on the actuator. As shown in FIG. 2, it is a traditional process schematic view in which the original excitation signal acts on the actuator. However, if the waveform of the original excitation signal U(t) is directly given, it is easy to reverse the generation mechanism of the excitation signal through the waveform of U(t), which may easily lead to theft of the excitation signal.

Step 104: the original excitation signal was encrypted to obtain an encrypted excitation signal. Vibration waveforms generated by the encrypted excitation signal and the original excitation signal while acting on the actuator are the same.

Wherein, the encrypted excitation signal refers to a signal obtained after encrypting the original excitation signal. An actuator refers to a vibrator capable of generating vibration such as a motor.

The encrypted excitation signal changes the waveform of the original excitation signal but the vibration waveforms generated by the encrypted excitation signal and the original excitation signal while acting on the actuator are the same. It should be noted that the same vibration waveform here is not absolutely the same but relatively the same and their difference can be ignored.

In an embodiment, encrypting the original excitation signal can amplify the high-frequency or low-frequency part of the original excitation signal to make the high-frequency or low-frequency part of the original excitation signal obvious so as to achieve the effect of encryption. When the encrypted excitation signal drives the actuator, the amplified high-frequency or low-frequency signal has no effect on the actuator so it is guaranteed that the vibration waveform generated by the encrypted excitation signal while acting on the driver is almost the same with the vibration waveform generated by the original excitation signal while acting on the actuator. It should be noted that there are multiple ways of original excitation signal and the way of encryption is not limited here.

In step 106, the encrypted excitation signal is used to drive the actuator to generate vibration.

Figure 3:
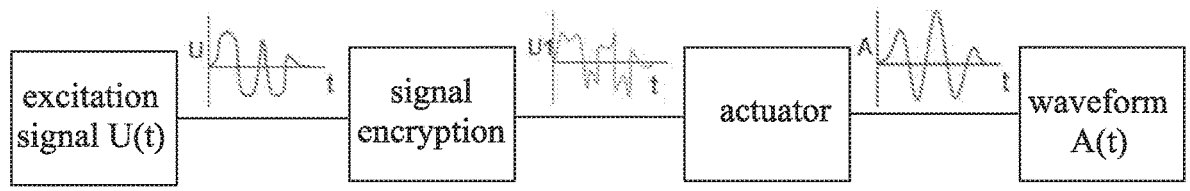
FIG. 3 is process schematic view of an encrypted excitation signal obtained by encrypting the original excitation signal in the embodiment and then acting on the actuator.

Wherein, encrypted excitation signal is used to drive actuator vibration to generate vibration waveform. As shown in FIG. 3 which is a process in the embodiment, the original excitation signal is encrypted to obtain an encrypted excitation signal, which is then applied to the actuator.

The excitation signal processing method first obtains the original excitation signal and then encrypts the original excitation signal to obtain an encrypted excitation signal. The vibration waveforms generated by the encrypted excitation signal and the original excitation signal while acting on the actuator are the same, so the encrypted excitation signal can be used to drive the actuator generates vibration. The encrypted excitation signal changes the shape of the original excitation signal, but vibration waveforms generated by acting on the actuator are identical, so that both a vibration waveform corresponding to the original excitation signal can be obtained and the original excitation signal is prevented from divulgence, and the problem that the excitation signal is stolen can be effectively solved.

In the embodiment, the original excitation signal was encrypted to obtain an encrypted excitation signal includes: performing vibration simulation on the original excitation signal to obtain a simulated vibration acceleration waveform; performing equalization on the simulated vibration acceleration waveform to obtain an encrypted excitation signal.

Figure 4:
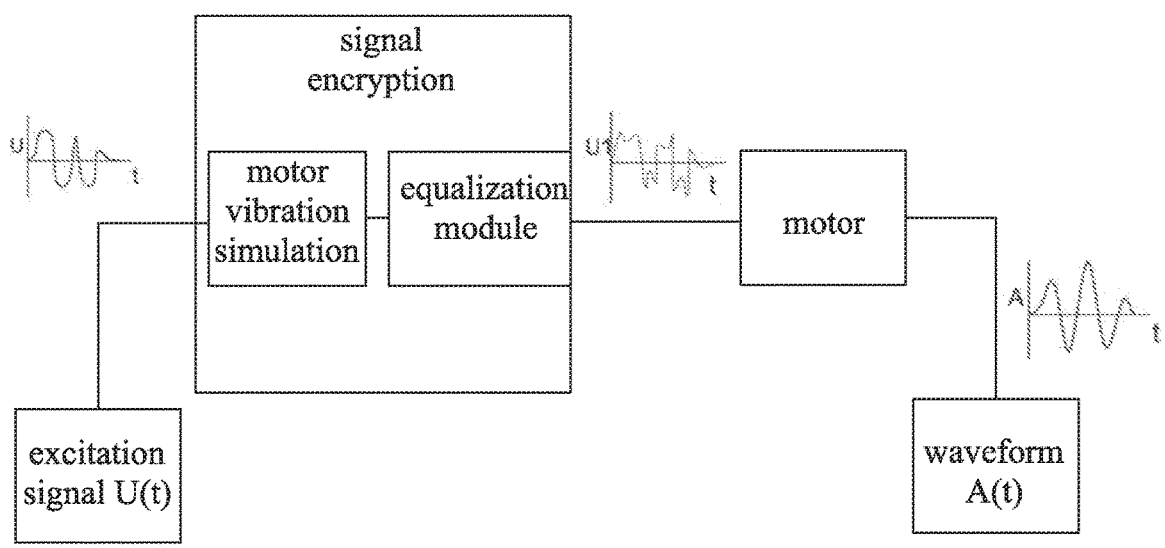
FIG. 4 is a process schematic view of encrypting the original excitation signal.

Among them, the vibration simulation refers to simulating the original excitation signal through the vibration as a simulated vibration acceleration waveform, i.e., simulating the vibration of the actuator. Then the simulated vibration acceleration waveform is equalized. The process of equalization is a process of encryption. The process of equalization can be encrypted by amplifying the signal of the high-frequency or low-frequency part to obtain an encrypted excitation signal. As shown in FIG. 4, in an embodiment, taking motor as an example, a process schematic view of encrypting the original excitation signal, the original excitation signal U(t) is the simulated vibration acceleration waveform $A1(t)$ obtained after the motor vibration simulation and then through the equalization, the module is encrypted to obtain the encrypted excitation signal $U1(t)$. $U1(t)$ acts on the motor and finally generates vibration waveform A(t).

The principle of vibration simulation is as follows:

The transfer function from voltage (excitation signal) to acceleration can be expressed as:

$$H(z) = \frac{\phi_0}{R_{eb}} \frac{1}{m_d} - \frac{\phi_0}{R_{eb}} \frac{1}{m_d^2} \frac{b_0 + b_1 z^{-1}}{1 + a_1 z^{-1} + a_2 z^{-2}};$$

where $\Phi_0$ is electromagnetic force coefficient of motor; $R_{eb}$ is motor resistance; $m_d$ is the quality of vibration motor; z is frequency; and other coefficients are defined as follows:

$$a_1 = -2e^{-\omega_z \zeta_t} \cos\left(\omega_z \sqrt{1 - \zeta_t^2}\right)$$
$$a_2 = e^{-2\omega_z \zeta_t}$$
$$\omega_z = \frac{\Omega_0}{f_s} \quad \zeta_t = \frac{1}{2Q_t}$$
$$b_0 = (C_1 + C_2)T_s = c_t T_s$$
$$b_1 = (C_1 \pi + C_2 \pi)T_s = c_t T_s$$

$\Omega_0$ is the resonant frequency of the LRA, $f_s$ is the sampling rate of the ADC (digital-to-analog converter), $Q_t$ is the quality factor of the LRA, $C_f$ is the damping coefficient of motor, $C_1$ and $C_2$ are the acceleration gain constant, $T_s$ is the period.

In an embodiment, the simulated vibration acceleration waveform is equalized to obtain an encrypted excitation signal including modulating the high frequency or low frequency in the simulated vibration acceleration waveform to obtain an encrypted excitation signal.

Among them, the process of equalization processing can be completed by modulating the high frequency or low frequency in the simulated vibration acceleration waveform. Modulation refers to amplifying or reducing the signal of the high frequency or low frequency part in order to change the waveform of the original excitation signal.

Figure 5:
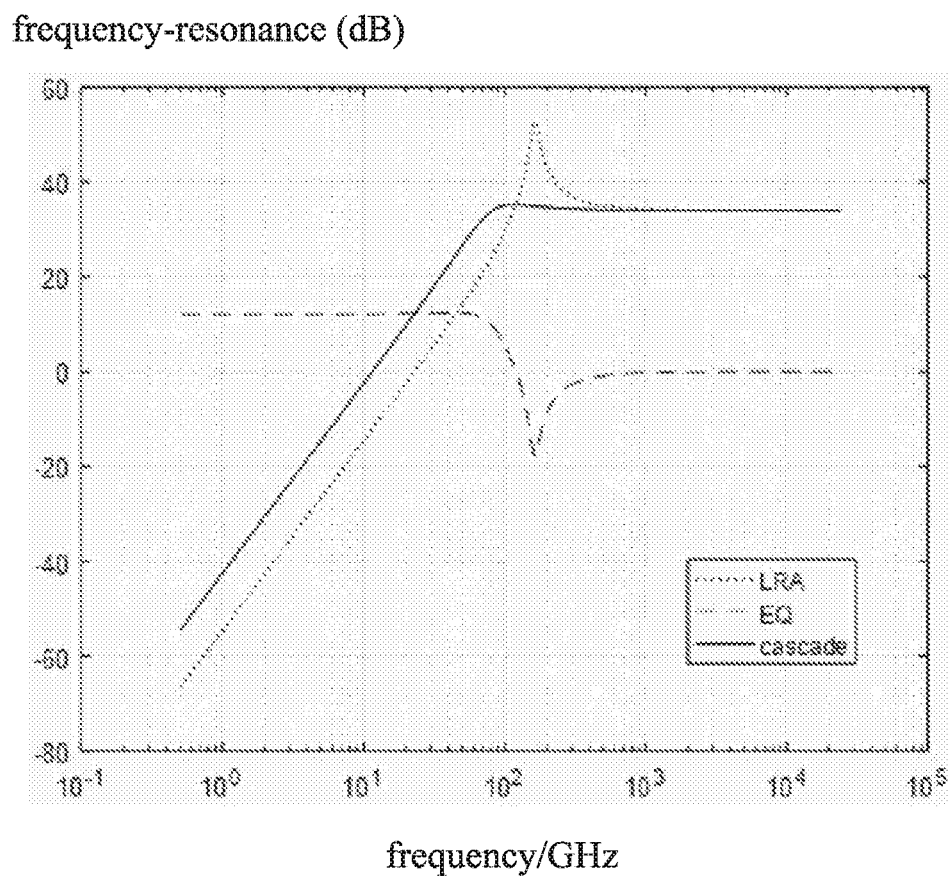
FIG. 5 is a frequency response chart before and after encrypting a motor in the embodiment.

As shown in FIG. 5, taking motor as an example, the excitation signals before and after encryption have little effect on the vibration of the motor and can be ignored. In FIG. 5, the frequency response of the motor is a short dot line, the frequency response of the EQ (equalization module) is a long dot line and the frequency response of the EQ and motor cascade is a solid line. It can be clearly seen from the figure that the frequency response after the cascade is almost the same as that of the motor. So you can use encrypted encrypted excitation signal instead of original excitation signal to drive motor vibration.

The principle is as follows: when the simulated vibration acceleration waveform passes the EQ (equalization module), the low frequency part (less than 20 Hz) will be amplified by about 15 dB (relative to the data after 1 KHz), then the low frequency part of the encrypted excitation signal obtained will be more obvious so as to achieve the encryption effect. The frequency response of the EQ+motor cascade has 20 dB attenuation so it has little effect on the final acceleration waveform.

The calculation formula of the EQ module is as follows:
First, the expression of the EQ transfer function is:

$$H_c(z) = \sigma_c \frac{1 + b_{1 \cdot a} z^{-1} + b_{2 \cdot a} z^{-2}}{1 + a_{1 \cdot d} z^{-1} + a_{2 \cdot d} z^{-2}} = \sigma_c \cdot H_{c1}(z)$$

Among them:

$$b_{1 \cdot a} = a_1$$
$$b_{2 \cdot a} = a_2$$
$$a_{1 \cdot d} = -2 e^{-\omega_d \zeta_d} \cos\left(\omega_d \sqrt{1 - \zeta_d^2}\right)$$
$$a_{2 \cdot d} = e^{-2\omega_d \zeta_d}$$
$$\omega_d = \frac{\Omega_d}{f_s}, \zeta_d = \frac{1}{2Q_d}$$

$\Omega_d$ and $Q_d$ is the specified desired resonance frequency. z is the frequency.

In order to make the gain near the high frequency zero after the acceleration is equalized, the gain coefficient $\sigma_c$ is solved as:

$$\sigma_c = \frac{1}{G_1 \cdot G_2}; \text{ where}$$

$$G_1 = H(z)|_{z=-1} = \frac{\phi_0}{R_{eb}} \frac{1}{m_d} - \frac{\phi_0}{R_{eb}} \frac{1}{m_d^2} \frac{b_0 - b_1}{1 - a_1 + a_2}$$

-continued $$G_2 = H_{c1}(z)|_{z=-1} = \frac{1 - b_{1 \cdot a} + b_{2 \cdot a}}{1 - a_{1 \cdot d} + a_{2 \cdot d}};$$

$R_{eb}$ is the DC resistance of the motor; other parameters are defined as above.

In an embodiment, vibration simulation is performed on the original excitation signal to obtain a simulated vibration acceleration waveform, which includes obtaining a linear parameter of the actuator and performing vibration simulation on the original excitation signal according to the linear parameter to obtain a simulated vibration acceleration waveform.

Among them, the linear parameter of the actuator refers to the parameter that determines the function of the actuator, which includes electromagnetic force coefficient, stiffness coefficient of spring, voice coil inductance, undamped natural frequency, damped eigen frequency, acceleration resonance frequency, mechanical damping coefficient, resistance coefficient and so on. By acquiring the linear parameter of the actuator, the vibration of the actuator can be simulated. Therefore, vibration simulation is imposed on the original excitation signal according to the linear parameter, so that the simulated vibration acceleration waveform is obtained.

In an embodiment, the actuator is a motor. Linear parameters obtaining the actuator includes obtaining the linear parameters of motor of the motor. Vibration simulation is performed on the original excitation signal according to the linear parameters to obtain the simulated vibration acceleration waveform, which includes: The vibration of the motor is simulated according to the linear parameters of motor to obtain a simulated vibration acceleration waveform.

Among them, motor is a kind of actuator. When the actuator is acted as a motor, the linear parameters of motor of the motor is obtained. The vibration of the motor is simulated according to the linear parameters of motor to obtain the simulated vibration acceleration waveform corresponding to the original excitation signal.

In an implementation, the original excitation signal was encrypted to obtain the encrypted excitation signal which includes: At least one vibration simulation model is used to process the original excitation signal to obtain a simulated vibration acceleration waveform. At least one equalization module is used to equalize the simulated vibration acceleration waveform to obtain an encrypted excitation signal.

Among them, the original excitation signal is encrypted. A vibration simulation model and an equalization module can be used to complete the encryption process. The number of vibration simulation models is not limited so dose the number of equalization modules. You can customize the settings according to actual needs. The vibration simulation model and the equalization module can have a one-to-one relationship or a one-to-many relationship.

Figure 6:
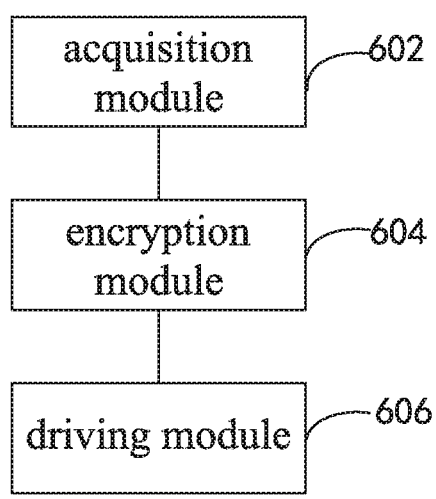
FIG. 6 is a block diagram of an actuator excitation signal processing device in the embodiment.

As shown in FIG. 6, an actuator excitation signal processing device is proposed, which includes:

An acquisition module 602, used to obtain original excitation signal;

An encryption module 604, used to encrypt the original excitation signal to obtain an encrypted excitation signal. The vibration waveforms generated by the encrypted excitation signal and the original excitation signal while acting on the actuator are the same;

A driving module 606, use the encrypted excitation signal to drive the actuator to generate vibration.

In an embodiment, the encryption module 604 is also used to perform vibration simulation on the original excitation signal to obtain a simulated vibration acceleration waveform and perform equalization on the simulated vibration acceleration waveform to obtain the encrypted excitation signal.

In an embodiment, the encryption module is also used to modulate the high frequency or low frequency in the simulated vibration acceleration waveform to obtain an encrypted excitation signal.

In an embodiment, the encryption module is also used to obtain a linear parameter of the actuator. Vibration simulation is performed on the original excitation signal according to the linear parameter to obtain the simulated vibration acceleration waveform.

In an embodiment, the actuator is a motor. The acquisition module is also used to obtain the linear parameters of the motor. The encryption module is also used to simulate the vibration of the original excitation signal according to the linear parameters to obtain the simulated vibration acceleration waveform.

In an embodiment, the encryption module is also used to process the original excitation signal with at least one vibration simulation model to obtain a simulated vibration acceleration waveform. At least one equalization module is used to equalize the simulated vibration acceleration waveform to obtain the encrypted excitation signal.

Figure 7:
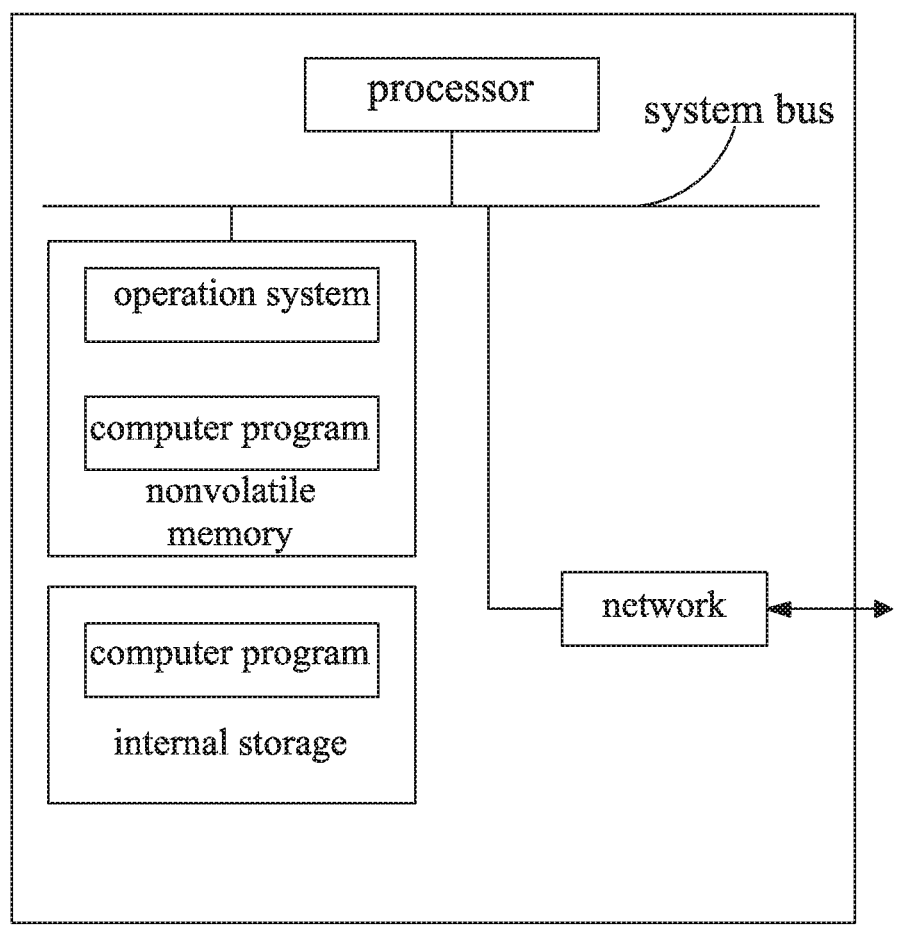
FIG. 7 shows an internal structural of computer equipment in an embodiment of the present invention.

FIG. 7 shows an internal structural view of computer equipment in an embodiment. The computer device may be a terminal. As shown in FIG. 7, the computer device includes a processor, a memory and a network interface connected by a system bus. Among them, memory includes non-volatile storage media and internal memory. The non-volatile storage medium of the computer device stores an operating system and may also store a computer program. When the computer program is executed by the processor, the processor may enable the processor to implement an actuator excitation signal processing method. A computer program may also be stored in the internal memory and when the computer program is executed by the processor, the processor may execute an actuator excitation signal processing method. The network interface is used to communicate with the outside world. Those skilled in the field may understand that the structure shown in FIG. 7 is only a block diagram of a part of the structure related to the solution of the present application and does not constitute a limitation on the computer device to which the solution of the present application is applied. The specific computer device may include more or fewer components than that shown in the figure. Some components are combined or have a different component arrangement.

In the embodiment, a computer device is proposed, which includes a memory and a processor. The memory stores a computer program. When the computer program is executed by the processor, the processor will perform the following steps: Obtaining original excitation signal. The encrypted original excitation signal is encrypted to obtain an encrypted excitation signal. The vibration waveforms generated by the encrypted excitation signal and the original excitation signal while acting on the actuator is the same. The encrypted excitation signal is used to drive the actuator to generate vibration.

In the embodiment, the original excitation signal is encrypted to obtain an encrypted excitation signal, which includes:

Vibration simulation is performed on the original excitation signal according to the linear parameters of motor to obtain the simulated vibration acceleration waveform.

In the embodiment, equalizing the simulated vibration acceleration waveform to obtain the encrypted excitation signal includes: modulating a high frequency or a low frequency in the simulated vibration acceleration waveform to obtain an encrypted excitation signal.

In the embodiment, vibration simulation is performed on the original excitation signal to obtain a simulated vibration acceleration waveform, which includes: obtaining linear parameters of the actuator; and performing vibration simulation on the original excitation signal according to the linear parameters to obtain a simulated vibration acceleration waveform.

In the embodiment, the actuator is a motor. Obtaining the linear parameter of the actuator includes: obtaining linear parameters of motor of the motor; performing vibration simulation on the original excitation signal according to the linear parameter to obtain the simulated vibration acceleration waveform includes: performing vibration simulation on the original excitation signal according to the linear parameters of motor to obtain the simulated vibration acceleration waveform.

In the embodiment, the original excitation signal is encrypted to obtain an encrypted excitation signal, which includes: processing the original excitation signal by using at least one vibration simulation model to obtain the simulated vibration acceleration waveform; and equalizing the simulated vibration acceleration waveform to obtain the encrypted excitation signal by using at least one equalizing module.

In the embodiment, a computer-readable storage medium stores a computer program. When the computer program is executed by a processor, the processor will perform the following steps: Obtaining original excitation signal; an encrypted excitation signal is obtained, by encrypting the original excitation signal, vibration waveforms generated by the encrypted excitation signal and the original excitation signal while acting on the actuator are the same; the encrypted excitation signal is used to drive the actuator to generate vibration.

In the embodiment, the original excitation signal is encrypted to obtain an encrypted excitation signal, which includes: performing vibration simulation on the original excitation signal to obtain the simulated vibration acceleration waveform; and equalizing the simulated vibration acceleration waveform to obtain the encrypted excitation signal.

In the embodiment, equalizing the simulated vibration acceleration waveform to obtain the encrypted excitation signal includes: modulating the high frequency or low frequency in the simulated vibration acceleration waveform to obtain the encrypted excitation signal.

In the embodiment, performing vibration simulation on the original excitation signal to obtain the simulated vibration acceleration waveform includes: obtaining the linear parameters of the actuator; and performing vibration simulation on the original excitation signal according to the linear parameters to obtain the simulated vibration acceleration waveform.

In the embodiment, the actuator is a motor; obtaining the linear parameters of the actuator includes: obtaining the linear parameters of motor of the motor; performing vibration simulation on the original excitation signal according to the linear parameter to obtain the simulated vibration acceleration waveform includes: performing vibration simulation on the original excitation signal according to the linear parameters of motor to obtain the simulated vibration acceleration waveform.

In the embodiment, the original excitation signal is encrypted to obtain an encrypted excitation signal, which includes: processing the original excitation signal by using at least one vibration simulation model to obtain the simulated vibration acceleration waveform; and equalizing the simulated vibration acceleration waveform to obtain the encrypted excitation signal by using at least one equalizing module.

Those of ordinary skill in the field can understand that all or part of the process in the implementation method described above can be completed by instructing relevant hardware through a computer program. The program can be stored in a non-volatile computer-readable storage medium. When the program is executed, it may include the implementation process of the above methods. Among them, any reference to the memory, storage, database or other media used in the implementations provided in this application may include non-volatile and/or volatile memory. Non-volatile memory may include read-only memory (ROM), programmable ROM (PROM), electrically programmable ROM (EPROM), electrically erasable programmable ROM (EEPROM) or flash memory. Volatile memory can include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain (Synchlink) DRAM (SLDRAM), memory bus (Rambus) direct RAM (RDRAM), direct memory bus dynamic RAM (DRDRAM) and memory bus dynamic RAM (RDRAM), etc.

The technical features of the above implementation can be combined arbitrarily. To simplify the description, all possible combinations of the technical features in the above implementation are not described. However, as long as there is no contradiction in the combination of these technical characteristics, they should be considered as the scope described in this manual.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An actuator excitation signal processing method comprising steps of:
    obtaining original excitation signal;
    encrypting the original excitation signal to obtain an encrypted excitation signal;
    generating vibration waveforms by the encrypted excitation signal same to the waveforms generated by the original excitation signal; and
    driving an actuator by the encrypted excitation signal, wherein the step of encrypting the original excitation signal to obtain an encrypted excitation signal includes:
        performing vibration simulation on the original excitation signal for obtaining a simulated vibration acceleration waveform;
        equalizing the simulated vibration acceleration waveform for obtaining is the encrypted excitation signal.

2. The method as described in claim 1, wherein the step of equalizing the simulated vibration acceleration waveform for obtaining the encrypted excitation signal includes:
    modulating the high frequency or low frequency in the simulated vibration acceleration waveform for obtaining an encrypted excitation signal.

3. The method as described in claim 1, wherein the step of performing vibration simulation on the original excitation signal for obtaining a simulated vibration acceleration waveform includes:
    obtaining a linear parameter of the actuator;
    performing vibration simulation on the original excitation signal according to the linear parameter to obtain the simulated vibration acceleration waveform.

4. The method as described in claim 3, wherein the actuator is a motor; the step of obtaining the linear parameter of the actuator includes:
    obtaining the linear parameters of the motor;
    and the step of performing vibration simulation on the original excitation signal according to the linear parameter to obtain the simulated vibration acceleration waveform includes:
    performing the vibration simulation on the original excitation signal according to the linear parameters of the motor to obtain the simulated vibration acceleration waveform.

5. The method as described in claim 1, wherein the step of encrypting the original excitation signal to obtain the encrypted excitation signal includes:
    performing at least one vibration simulation model on the original excitation signal to obtain a simulated vibration acceleration waveform;
    equalizing the simulated vibration acceleration waveform by at least one equalization module to obtain the encrypted excitation signal.

6. A computer device includes a memory and a processor, wherein the memory stores a computer program; when the computer program is executed by the processor, the processor is triggered to perform the steps as described in claim 1.

7. An actuator excitation signal processing device comprising:
    an acquisition module for acquiring original excitation signal;
    an encryption module for encrypting the original excitation signal to obtain an encrypted excitation signal; wherein vibration waveforms generated by the encrypted excitation signal and the original excitation signal which acting on the actuator respectively are the same; and
    a driving module for driving the actuator to generate vibration using the encrypted excitation signal,
    wherein the encryption module is used for performing vibration simulation on the original excitation signal to obtain a simulated vibration acceleration waveform; equalization is performed on the simulated vibration acceleration waveform to obtain the encrypted excitation signal.

* * * * *